(12) United States Patent
An et al.

(10) Patent No.: US 12,339,863 B2
(45) Date of Patent: Jun. 24, 2025

(54) METHOD FOR SCHEDULING OFFLOADING SNIPPETS BASED ON LARGE AMOUNT OF DBMS TASK COMPUTATION

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 240 days.

(21) Appl. No.: 17/985,994

(22) Filed: Nov. 14, 2022

(65) Prior Publication Data
US 2023/0153317 A1 May 18, 2023

(30) Foreign Application Priority Data
Nov. 15, 2021 (KR) .................... 10-2021-0156264

(51) Int. Cl.
*G06F 16/24* (2019.01)
*G06F 16/2453* (2019.01)
*G06F 16/25* (2019.01)

(52) U.S. Cl.
CPC ...... *G06F 16/252* (2019.01); *G06F 16/24542* (2019.01)

(58) Field of Classification Search
CPC .................... G06F 16/252; G06F 16/24542
See application file for complete search history.

(56) References Cited

U.S. PATENT DOCUMENTS

| 7,885,953 | B2 * | 2/2011 | Chen ................... G06F 16/2456 707/602 |
| 10,691,722 | B2 * | 6/2020 | Guirguis ............. G06F 16/2379 |
| 2007/0083638 | A1 * | 4/2007 | Pinkerton ............. H04L 69/161 709/224 |
| 2008/0183688 | A1 * | 7/2008 | Chamdani ........... G06F 16/2453 |

(Continued)

FOREIGN PATENT DOCUMENTS

KR 10-2154446 B1 9/2020

OTHER PUBLICATIONS

Qiao, Lin, et al. "Integration of Server, Storage and Database Stack: Moving Processing Towards Data." 2008 IEEE 24th International Conference on Data Engineering. IEEE, 2008.

(Continued)

*Primary Examiner* — Merilyn P Nguyen
(74) *Attorney, Agent, or Firm* — NSIP Law (57) ABSTRACT

There is provided a method for scheduling offloading snippets based on a large amount of DBMS task computation. A DB scheduling method according to an embodiment of the disclosure includes determining, by a DBMS, whether to offload a part of query computations upon receiving a query execution request from a client, generating, by the DBMS, an offloading code which is a code for offloading a part of the query computations, based on the received query, when offloading is determined, selecting one of the plurality of storages in which a DB is established, and delivering the offloading code. Accordingly, snippets which will be generated simultaneously are scheduled for CSDs, so that resources are equally utilized, a query execution time is reduced, and reliability on data processing is enhanced.

15 Claims, 6 Drawing Sheets

(56) References Cited

U.S. PATENT DOCUMENTS

| | | | |
|---|---|---|---|
| 2014/0207755 A1* | 7/2014 | Hacigumus | G06F 16/24542 |
| | | | 707/718 |
| 2018/0349458 A1* | 12/2018 | Guirguis | G06F 16/273 |
| 2020/0233882 A1* | 7/2020 | Ichilevici de Oliveira | |
| | | | G06F 9/4552 |
| 2020/0394191 A1* | 12/2020 | Fender | G06F 16/212 |
| 2021/0073232 A1* | 3/2021 | Lee | G06F 16/24542 |
| 2021/0271680 A1* | 9/2021 | Lee | G06F 9/30038 |
| 2022/0156163 A1* | 5/2022 | Pasupuleti | G06F 16/24537 |
| 2024/0103821 A1* | 3/2024 | Sockalingasamy | G06F 8/433 |

OTHER PUBLICATIONS

Rahman, Md. Arif, et al. "A Survey on Declarative Code Offloading Techniques in Different In-Memory RDBMSs in Federated Environment." Korean Society of Information Scientists and Engineers Academic Presentation Papers (2020): 74-76.

Korean Office Action issued on Aug. 10, 2023, in counterpart Korean Patent Application No. 10-2021-0156264 (5 pages in English, 8 pages in Korean).

* cited by examiner

METHOD FOR SCHEDULING OFFLOADING SNIPPETS BASED ON LARGE AMOUNT OF DBMS TASK COMPUTATION

CLAIM OF PRIORITY

This application is based on and claims priority under 35 U.S.C. § 119 to Korean Patent Application No. 10-2021-0156264, filed on Nov. 15, 2021, in the Korean Intellectual Property Office, the disclosure of which is herein incorporated by reference in its entirety.

BACKGROUND

Field

The disclosure relates to a database (DB) processing technology, and more particularly, to a method for processing a query execution request of a client without a delay in an environment where a database management system (DBMS) and a storage in which a DB is established are disaggregated.

Description of Related Art

In a query execution process, a database management system (DBMS) may acquire data by scanning a query in a database (DB), filter the acquired data, and return only the filtered data to a client.

However, when there are many data to be scanned in the DB, many data are transmitted from a storage in which the DB is established to the DBMS, and accordingly, there are problems that a bandwidth becomes scarce and an overall response speed is reduced, and power consumption increases.

As a solution to these problems, there is a method of implementing the storage of the DB by using a computational storage drive (CSD), and allowing the storage to perform a part of the query computations. However, a specific method to achieve this has not yet been proposed.

SUMMARY

The disclosure has been developed to address the above-discussed deficiencies of the prior art, and an object of the present disclosure is to provide a method of defining a snippet for offloading a part of query computations in a DB system using a CSD, and scheduling the snippets which will be generated simultaneously for CSDs.

According to an embodiment of the disclosure to achieve the above-described object, a DB scheduling method may include: a step of receiving, by a DBMS, a query execution request from a clint; a step of determining, by the DBMS, whether to offload a part of query computations; a step of, when offloading is determined, generating, by the DBMS, an offloading code which is a code for offloading a part of the query computations, based on the received query; a first selection step of selecting, by the DBMS, one of a plurality of storages in which a DB is established; and a step of delivering, by the DBMS, the offloading code to the storage selected at the first selection step.

The step of determining may include determining by determining which is appropriate, the DBMS processing all of the query computations, or the storage processing a part of the query computations and the DMBS processing the other query computations.

The step of determining may include determining to offload a part of the query computations when there is a large amount of data transmitted between the DBMS and the storage.

The first selection step may include selecting a storage that has the most unused resources by monitoring a resource state of the storages.

According to an embodiment of the disclosure, the DB scheduling method may further include: a second selection step of selecting, by the storage which receives the offloading code, one of a plurality of CSDs; and a step of delivering, by the storage, the received offloading code to the CSD selected at the second selection step.

The second selection step may include selecting a CSD that has most unused resources by monitoring a resource state of the CSDs.

The offloading code may be generated as a snippet, and may include a parsed query and BufferAddress, and the BufferAddress may be an address of a buffer which stores a result of performing a part of the query computations by the offloading code.

The buffer may be provided in the DBMS. The DBMS and the storages may be disaggregated.

According to another embodiment of the disclosure, a DB system may include: a plurality of storages in which a DB is established; and a DBMS configured to determine whether to offload a part of query computations upon receiving a query execution request from a client, to generate an offloading code which is a code for offloading a part of the query computations, based on the received query, when offloading is determined, to select one of the plurality of storages, and to deliver the offloading code.

According to still another embodiment of the disclosure, a DB scheduling method may include: a step of generating, by a DBMS, an offloading code which is a code for offloading query computations, based on a query received from a client; a first selection step of selecting, by the DBMS, one of a plurality of storages in which a DB is established; and a step of delivering, by the DBMS, the offloading code to the storage selected at the first selection step.

According to yet another embodiment of the disclosure, a DB system may include a plurality of storages in which a DB is established, and a DBMS configured to generate an offloading code which is a code for offloading query computations, based on a query received from a client, to select one of a plurality of storages, and to deliver the offloading code.

According to embodiments of the disclosure as described above, in a DB system using a CSD, a snippet for offloading a part of query computations may be defined, and snippets which will be generated simultaneously are scheduled for CSDs, so that CSD resources are equally utilized, a query execution time is reduced, and reliability on data processing is enhanced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in detail with reference to the accompanying drawings.

An embodiment of the disclosure provides a method for defining a snippet for offloading (pushing down) a part of query computations onto a computational storage drive (CSD) in a DB system using the CSD, and scheduling the snippet by considering a resource state of the CSD.

Figure 1:
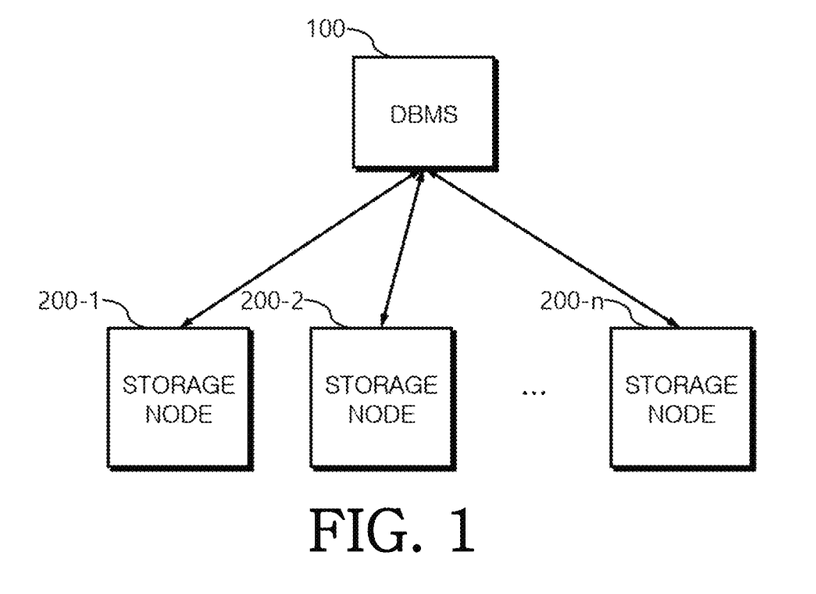
FIG. 1 is a view illustrating a DB system according to an embodiment of the disclosure.

FIG. 1 is a view illustrating a DB system according to an embodiment of the disclosure. The DB system according to an embodiment of the disclosure may be divided into a database management system (DBMS) 100 and a plurality of storage nodes 200-1, 200-2, . . . , 200-n as shown in the drawing.

The storage nodes 200-1, 200-2, . . . , 200-n refer to storage systems in which the same DB is established. The plurality of storage nodes 200-1, 200-2, . . . , 200-n may be implemented in order to process many queries which are requested simultaneously.

Furthermore, the storage nodes 200-1, 200-2, . . . , 200-n include a computation function, and may perform a part of query computations.

The DBMS 100 is a system that executes a query according to a request of a client (not shown) and returns a result thereof. All of the query computations may be performed by the DBMS 100, but a part of the query computations may be offloaded onto the storage nodes 200-1, 200-2, . . . , 200-n.

Figure 2:
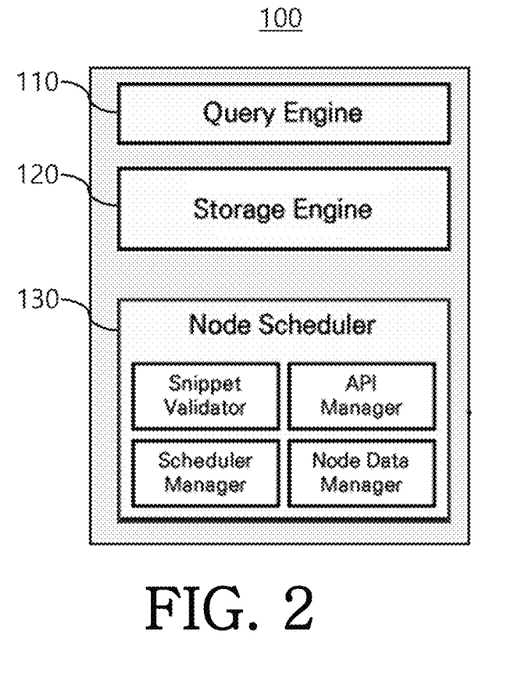
FIG. 2 is a view illustrating a structure of the DBMS shown in FIG. 1.

FIG. 2 is a view illustrating a structure of the DBMS 100 shown in FIG. 1. As shown in the drawing, the DBMS 100 may include a query engine 110, a storage engine 120, and a node scheduler 130.

Upon receiving a query execution request from a client, the query engine 110 may optimize the received query and deliver the same to the storage engine 120.

The storage engine 120 may determine whether to offload query computations. Offloading query computations may refer to offloading a part of the query computations onto the storage nodes 200-1, 200-2, . . . , 200-n. A part of the query computations may include query scanning, filtering, and validation.

The storage engine 120 generates a query computation offloading snippet based on the query, and delivers the generated query computation offloading snippet to the node scheduler 130.

Figure 3:
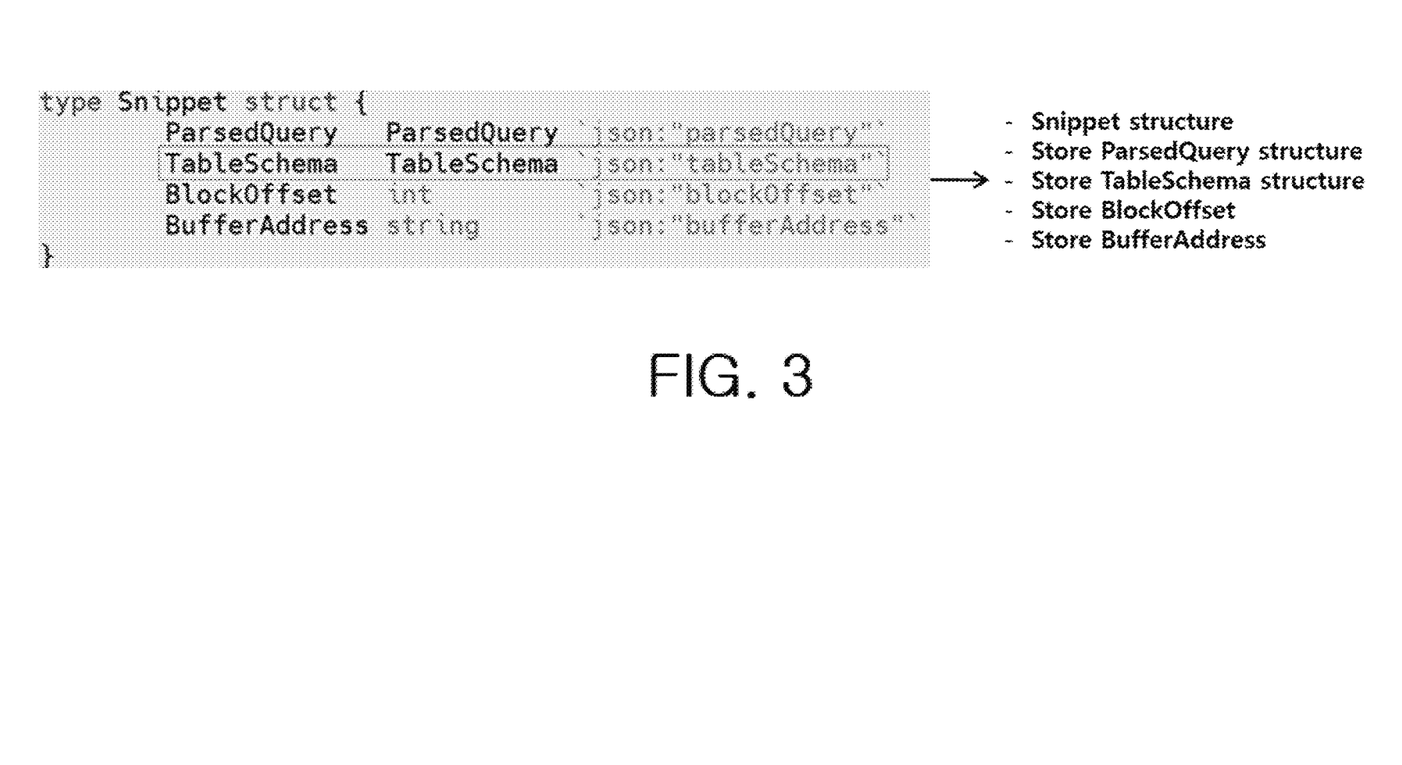
FIG. 3 is a view illustrating a structure of a query computation offloading snippet.

The query computation offloading snippet generated by the storage engine 120 is a source code for offloading a part of the query computations onto a storage node, and a detailed structure thereof is illustrated in FIG. 3.

As shown in the drawing, the query computation offloading snippet includes ParsedQuery, TableSchema, BlockOffset, and BufferAddress. The BufferAddress refers to an address of a buffer (not shown) that stores a result of performing a part of the query computations according to the query computation offloading snippet. The buffer is provided in the storage engine 120.

Figure 4:
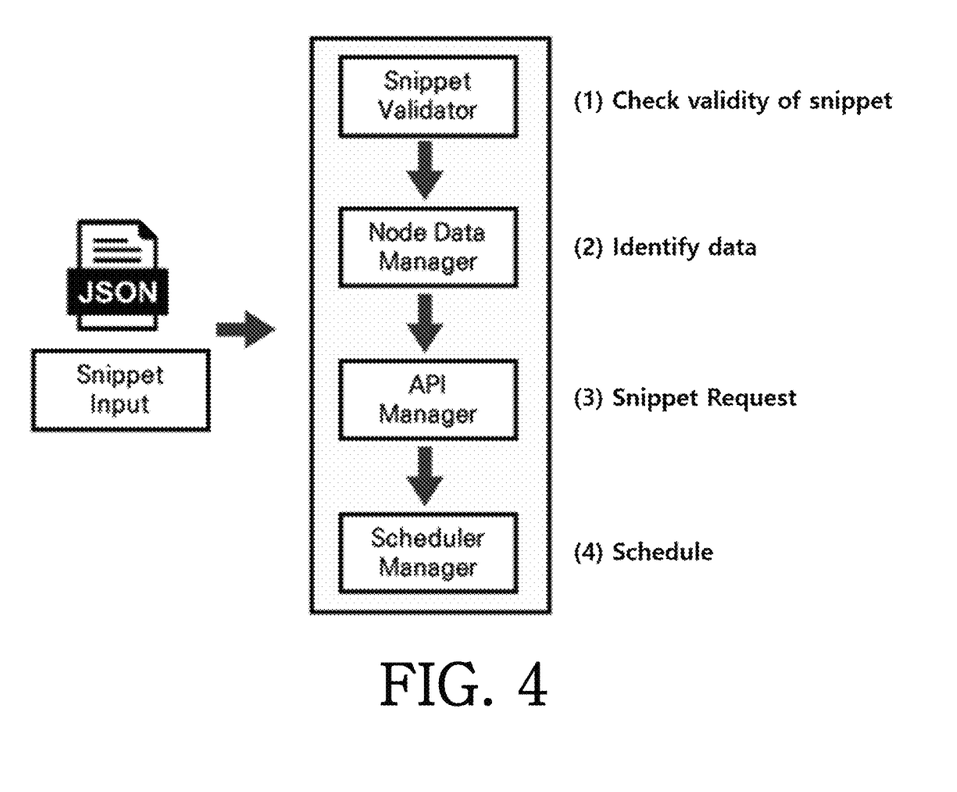
FIG. 4 is a view provided to explain a process of delivering a query computation offloading snippet.

The node scheduler 130 delivers the query computation offloading snippet generated by the storage engine 120 to the storage nodes 200-1, 200-2, . . . , 200-n. This process is illustrated in FIG. 4.

As shown in the drawing, when the query computation offloading snippet is inputted from the storage engine 120, a snippet validator of the node scheduler 130 checks validity of the query computation offloading snippet (1).

In addition, a node data manager of the node scheduler 130 may identify a DB table that should perform a query computation offloading snippet (2), and an API manager of the node scheduler 130 requests a scheduler manager to schedule the query computation offloading snippet (3).

Accordingly, the scheduler manager of the node scheduler 130 may select one of the storage nodes 200-1, 200-2, . . . , 200-n, and may deliver the query computation offloading snippet (4).

Figure 5:
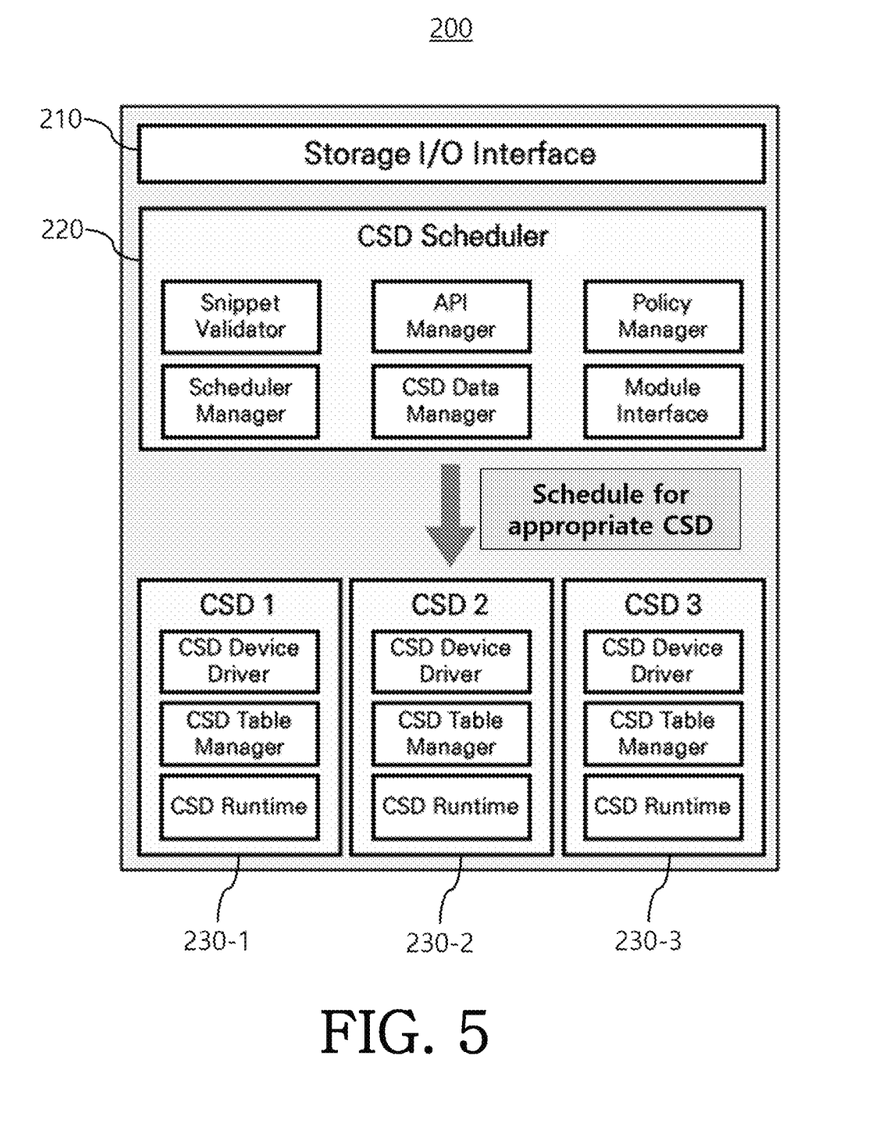
FIG. 5 is a view illustrating a structure of the storage node shown in FIG. 1.

FIG. 5 is a view illustrating a structure of the storage nodes 200-1, 200-2, . . . , 200-n shown in FIG. 1. Since the storage nodes 200-1, 200-2, . . . , 200-n may be implemented in the same way, only one storage node 200 is illustrated in FIG. 5 as a representative by using reference numeral "200."

As shown in the drawing, the storage node 200 may include a storage I/O interface 210, a CSD scheduler 220, and a plurality of CSDs 230-1, 230-2, 230-3.

The storage I/O interface 210 may be an interface for communicating with the DBMS 100. The CSDs 230-1, 230-2, 230-3 include not only storage resources for storing a DB, but also CPU resources (for example, a CSD runtime) for performing a part of query computations.

When a query computation offloading snippet is delivered from the node scheduler 130 of the DBMS 100 through the storage I/O interface 210, the CSD scheduler 220 may select one of the CSDs 230-1, 230-3, 230-3 and may deliver the query computation offloading snippet.

Figure 6:
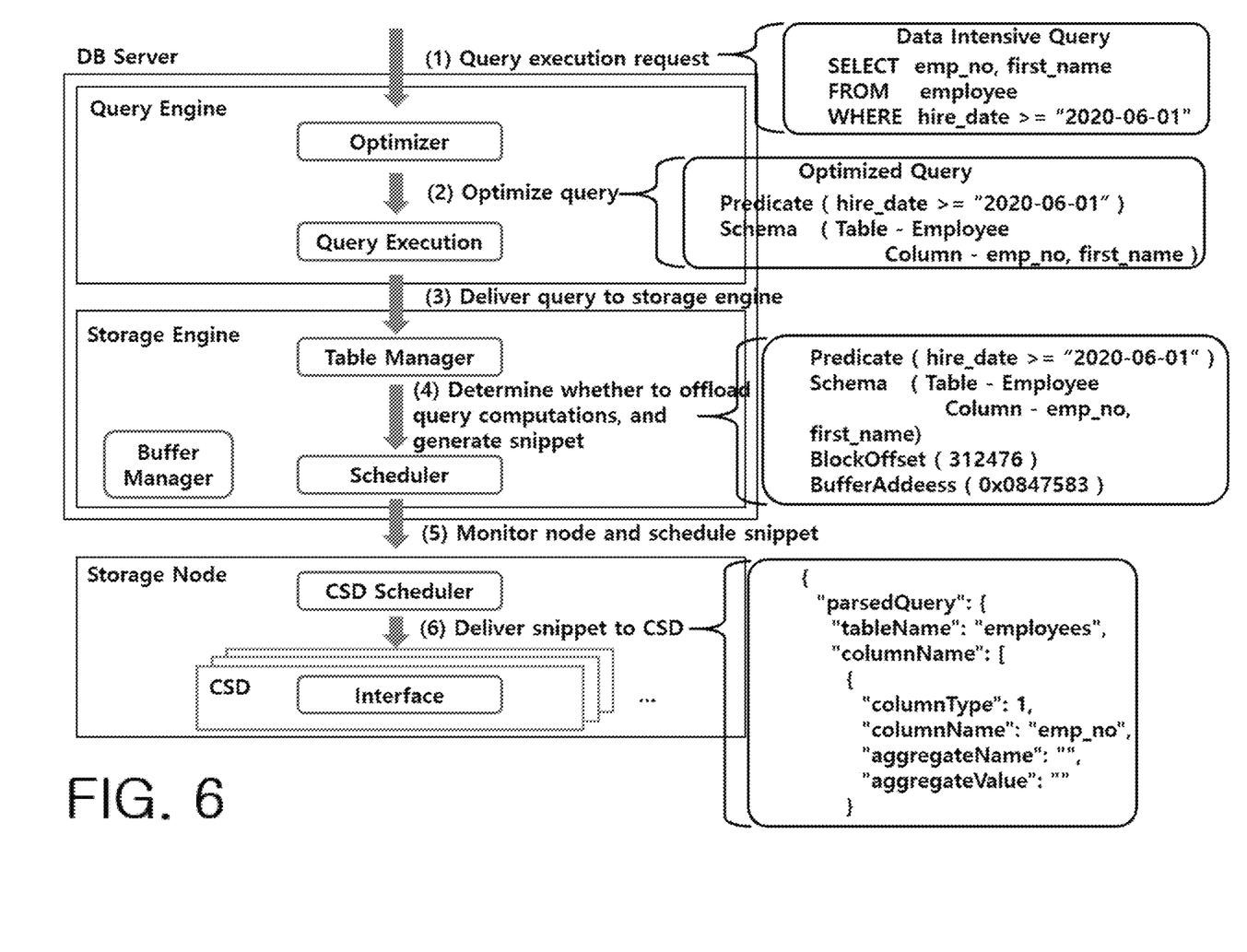
FIG. 6 is a view provided to explain a query computation offloading snippet scheduling method according to another embodiment of the disclosure.

FIG. 6 is a view provided to explain a query computation offloading snippet scheduling method according to another embodiment of the disclosure.

When the query engine 110 of the DBMS 100 receives a query execution request from a client (not shown) (1), an optimizer of the query engine 110 may optimize the received query (2) and may deliver the query to the storage engine 120 (3).

Then, a table manager of the storage engine 120 may determine whether to offload query computations, and, when offloading is determined, the table manager may generate a query computation offloading snippet based on the query (4).

It may be determined whether the query computations are offloaded by determining whether it is appropriate for the query engine 110 to execute all of the query computations, or whether it is appropriate for the storage nodes 200-1, 200-2, . . . , 200-*n* to execute a part of the query computations, and for the query engine 110 to execute the other query computations.

When there is a large amount of data transmitted between the DBMS 100 and the storage nodes 200-1, 200-2, . . . , 200-*n* in executing a query, that is, when there are many data to be scanned, offloading the query computations may be appropriate, but in other cases, offloading the query computations may be inappropriate.

Herein, it is assumed that, in operation "④," offloading the query computations is determined and the query computation offloading snippet is generated.

The node scheduler 130 may select one of the storage nodes 200-1, 200-2, . . . , 200-*n*, and may deliver the query computation offloading snippet (5).

Herein, the node scheduler 130 may monitor a resource state (a CPU core, a memory) of the storage nodes 200-1, 200-2, . . . , 200-*n*, and may select a storage node that has the most unused resources. This is for equal utilization of resources, reduction of a query computation time, and enhancement of data processing reliability.

The CSD scheduler 220 of the storage node which receives the query computation offloading snippet may select one of the plurality of CSDs 230-1, 230-2, 230-3 owned by the CSD scheduler 220, and may deliver the query computation offloading snippet (6).

Herein, the CSD scheduler 220 may monitor a resource state (a CPU core, a memory) of the CSDs 230-1, 230-2, 230-3, and may select a CSD that has the most unused resources. This is for equal utilization of resources, reduction of a query computation time, and enhancement of data processing reliability.

Thereafter, the selected CSD may receive the query computation offloading snippet, and may perform a part of the query computations, and return a result thereof to the buffer of the storage engine 120. An address of the buffer to which the result is returned may be indicated by the query computation offloading snippet.

Up to now, a method for defining a snippet for offloading a part of query computations to a CSD in a DB system using the CSD, and scheduling the snippet by considering a resource state of the CSD have been described in detail with reference to preferred embodiments.

Specifically, in an embodiment of the disclosure, a query computation offloading snippet is proposed as a structure for offloading a part of query computations from a DMBS onto a storage when the storage is implemented by using a CSD in a cloud-native environment, in which the DBMS and the storage are disaggregated.

In addition, in an embodiment of the disclosure, computation offloading snippets which are generated simultaneously due to a large amount of queries are scheduled based on a resource state of a CSD, so that resources are equally utilized, a response time is reduced, and reliability on data processing is enhanced.

The technical concept of the disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A DataBase (DB) scheduling method comprising:
   receiving, by a DataBase Management System (DBMS), a query execution request from a client;
   determining, by the DBMS, whether to offload a part of query computations;
   based on a result of determining to offload the part of the query computations, generating, by the DBMS, an offloading code including information used for offloading the part of the query computations, based on the received query;
   performing a first selection of selecting, by the DBMS, one of a plurality of storages in which a DB is established;
   delivering, by the DBMS, the offloading code to the storage selected at the first selection;
   performing a second selection of selecting, by the storage which receives the offloading code, one of a plurality of computational storage drives (CSDs); and
   delivering, by the storage, the received offloading code to the CSD selected at the second selection,
   wherein the determining comprises:
   determining whether the DBMS processes all of the query computations, and
   determining whether the storage processes the part of the query computations and the DMBS processes another part or the rest of query computations.

2. The DB scheduling method of claim 1, wherein the determining comprises determining to offload the part of the query computations in response to determining that there is a predetermined large amount of data transmitted between the DBMS and the storage.

3. The DB scheduling method of claim 1, wherein the performing the first selection comprises selecting a storage that has the most unused resources by monitoring a resource state of the storages.

4. The DB scheduling method of claim 1, wherein the performing the second selection comprises selecting a CSD that has most unused resources by monitoring a resource state of the CSDs.

5. The DB scheduling method of claim 1, wherein the offloading code is generated as a snippet, and comprises a parsed query and BufferAddress, and
   wherein the BufferAddress is an address of a buffer which stores a result of performing a part of the query computations by the offloading code.

6. The DB scheduling method of claim 5, wherein the buffer is provided in the DBMS.

7. The DB scheduling method of claim 1, wherein the DBMS and the storages are disaggregated.

8. A DataBase (DB) system comprising:
a plurality of storages in which a DB is established; and
a DataBase Management System (DBMS) configured to:
determine whether to offload a part of query computations upon receiving a query execution request from a client;
generate an offloading code including information used for offloading a part of the query computations, based on the received query, when offloading is determined;
perform a first selection of selecting one of the plurality of storages; and
deliver the offloading code,
wherein a storage, of the plurality of storages, is configured to:
perform a second selection of selecting one of a plurality of computational storage drives (CSDs); and
deliver the received offloading code to the CSD selected at the second selection,
wherein, for the determining, the DBMS is configured to:
determine whether the DBMS processes all of the query computations, and
determine whether the storage processes the part of the query computations and the DMBS processes another part or the rest of query computations.

9. A DataBase (DB) scheduling method comprising:
generating, by a DataBase Management System (DBMS), an offloading code including information used for offloading query computations, based on a query received from a client;
performing a first selection of selecting, by the DBMS, one of a plurality of storages in which a DB is established;
delivering, by the DBMS, the offloading code to the storage selected at the first selection;
performing a second selection of selecting, by the storage which receives the offloading code, one of a plurality of computational storage drives (CSDs); and
delivering, by the storage, the received offloading code to the CSD selected at the second selection,
wherein the generating comprises:
determining whether the DBMS processes all of the query computations, and
determining whether the storage processes the part of the query computations and the DMBS processes another part or the rest of query computations.

10. The DB system of claim 8, wherein the determining comprises determining to offload a part of the query computations when there is a predetermined amount of data transmitted between the DBMS and the storage.

11. The DB system of claim 8, wherein the performing the first selection comprises selecting a storage that has the most unused resources by monitoring a resource state of the storages.

12. The DB system of claim 8, wherein the performing the second selection comprises selecting a CSD that has most unused resources by monitoring a resource state of the CSDs.

13. The DB system of claim 8, wherein the offloading code is generated as a snippet, and comprises a parsed query and BufferAddress, and
wherein the BufferAddress is an address of a buffer which stores a result of performing a part of the query computations by the offloading code.

14. The DB system of claim 13, wherein the buffer is provided in the DBMS.

15. The DB system of claim 8, wherein the DBMS and the storages are disaggregated.

\* \* \* \* \*